US012712185B2

(12) United States Patent
Nakano et al.

(10) Patent No.: US 12,712,185 B2
(45) Date of Patent: Aug. 18, 2026

(54) BINDER FOR SECONDARY BATTERY ELECTRODE AND USE THEREOF

(71) Applicant: TOAGOSEI CO. LTD., Tokyo (JP)

(72) Inventors: Tomoko Nakano, Nagoya (JP); Masanori Hiromoto, Nagoya (JP); Naohiko Saito, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 585 days.

(21) Appl. No.: 17/290,108

(22) PCT Filed: Oct. 25, 2019

(86) PCT No.: PCT/JP2019/042063
§ 371 (c)(1),
(2) Date: Apr. 29, 2021

(87) PCT Pub. No.: WO2020/090694
PCT Pub. Date: May 7, 2020

(65) Prior Publication Data

US 2021/0399306 A1 Dec. 23, 2021

(30) Foreign Application Priority Data

Oct. 29, 2018 (JP) ................................ 2018-203158

(51) Int. Cl.
*H01M 4/62* (2006.01)
*C08L 33/02* (2006.01)
*H01M 4/04* (2006.01)

(52) U.S. Cl.
CPC ............ *H01M 4/622* (2013.01); *C08L 33/02* (2013.01); *H01M 4/0404* (2013.01)

(58) Field of Classification Search
CPC ...................................................... C08L 33/02
See application file for complete search history.

(56) References Cited

U.S. PATENT DOCUMENTS

| | | | | |
|---|---|---|---|---|
| 2011/0171526 | A1 | 7/2011 | Wakizaka et al. | |
| 2015/0050555 | A1 | 2/2015 | Fukumine et al. | |
| 2015/0287993 | A1 | 10/2015 | Komaba et al. | |
| 2017/0352886 | A1 * | 12/2017 | Matsuzaki | C09D 5/24 |
| 2018/0102542 | A1 | 4/2018 | Matsuzaki et al. | |
| 2018/0108917 | A1 | 4/2018 | Matsuzaki et al. | |
| 2018/0138508 | A1 | 5/2018 | Komaba et al. | |

FOREIGN PATENT DOCUMENTS

| | | | | |
|---|---|---|---|---|
| CN | 102217121 | A | 10/2011 | |
| CN | 104302671 | A * | 1/2015 | H01M 4/62 |
| CN | 104813525 | A | 7/2015 | |
| CN | 107534150 | A | 1/2018 | |
| JP | 2000-192115 | A | 7/2000 | |
| JP | 2012-256541 | A | 12/2012 | |
| JP | 2013-043911 | A | 3/2013 | |
| JP | 2013-165033 | A | 8/2013 | |
| JP | 2016-015254 | A | 1/2016 | |
| WO | 2010/032784 | A1 | 3/2010 | |
| WO | 2013/129658 | A1 | 9/2013 | |
| WO | 2015/029835 | A1 | 3/2015 | |
| WO | 2016/158964 | A1 | 10/2016 | |
| WO | 2018/180812 | A1 | 10/2018 | |

OTHER PUBLICATIONS

JP2013165033A_Machine Translation (Year: 2013).*
CN104302671A Machine translation (Year: 2014).*
University of Minnesota, "ICP Analysis" [Retrieved Jul. 29, 2025] Retrieved from the Internet, <URL: https://ral.cfans.umn.edu/tests-analysis/icp-analysis#:~:text=contact%20the%20laboratory.-,Methods,corresponding%20element%20in%20the%20sample> (Year: 2025).*
WO2015029835A1 Machine translation (Year: 2015).*
Dec. 26, 2023 Office Action issued in Japanese Patent Application No. 2020-553865.
Dec. 3, 2019 International Search Report issued in International Patent Application No. PCT/JP2019/042063.
Dec. 3, 2019 Written Opinion issued in International Patent Application No. PCT/JP2019/042063.
May 25, 2023 Office Action issued in Chinese Patent Application No. 201980071738.8.
Jul. 25, 2023 Office Action issued in Japanese Patent Application No. 2020-553865.
Feb. 24, 2024 Office Action issued in Chinese Patent Application No. 201980071738.8.
Jun. 29, 2024 Office Action issued in Chinese Patent Application No. 201980071738.8.
Oct. 15, 2024 Office Action issued in Japanese Patent Application No. 2020-553865.

* cited by examiner

*Primary Examiner* — Jonathan G Leong
*Assistant Examiner* — Aryana Y. Ortiz
(74) *Attorney, Agent, or Firm* — Oliff PLC

(57) ABSTRACT

A secondary battery electrode has excellent characteristics. As a binder for a secondary battery electrode, a crosslinked polymer or salt thereof having a carboxyl group is used. The crosslinked polymer or salt includes 30 mass % or more and not more than 100 mass % of a structural unit derived from an ethylenically unsaturated carboxylic acid monomer and a metal ion content of the crosslinked polymer or salt thereof is not more than 100 ppm or less.

12 Claims, No Drawings

BINDER FOR SECONDARY BATTERY ELECTRODE AND USE THEREOF

TECHNICAL FIELD

The present teaching relates to a binder for a secondary battery electrode, and use thereof.

CROSS-REFERENCE TO RELATED APPLICATIONS

The present teaching relates to a binder for a secondary battery electrode and use thereof. This application is a related application of Japanese Patent Application No. 2018-203158 filed on Oct. 29, 2018, and claims priority based on this Japanese application and the entire contents of which are incorporated herein by reference.

BACKGROUND ART

Various electrical storage devices, such as nickel-hydrogen secondary batteries, lithium-ion secondary batteries and electrical double-layer capacitors, are in practical use as secondary batteries. To produce electrodes used in these secondary batteries, a composition forming an electrode mixture layer containing an active material, a binder and the like is coated and dried and the like on a collector. In the case of lithium-ion secondary batteries for example, water-based binders containing styrene-butadiene rubber (SBR) latex and carboxymethyl cellulose (CMC) are used as binders in negative electrode mixture layer compositions.

Because contamination by foreign matter, such as metal, inside the battery may cause battery short-circuits or ignition, the amounts of such contaminants need to be reduced and managed. For example, magnetic metals may be removed with a magnet filter and metals ions may be removed with an ion-exchange resin when a binder composition for an electrical storage device is packed in a container (Patent Literature 1). Moreover, a method for manufacturing a secondary battery binder composition containing a polymer and a dispersion medium is disclosed, with the method including a step of removing particulate metal components by magnetic force from a mixture containing the polymer and dispersion medium (Patent Literature 2).

PATENT LITERATURE

Patent Literature 1 Japanese Patent Application Publication No. 2016-15254

Patent Literature 2 WO 2010/032784

SUMMARY

Technical Problem

However, Patent Literature 1 does not specifically describe the metal content or the like. Patent Literature 2 only gives the examples of a diene polymer and an acrylic acid ester polymer in Examples and does not specifically disclose an acrylic acid polymer having a structural unit derived from an ethylenically unsaturated monomer having a carboxyl group.

That is, although both of the above literature describe a method for removing metal foreign matter and the like from a dispersion (slurry) containing a polymer and a dispersion medium, neither mentions removing metal contaminants from a polymer in a powder or other solid form containing no dispersion medium, nor the effects of such removal. Furthermore, neither specifically describes removing metal foreign matter from an acrylic acid polymer.

The inventors have found, while confirming the effects of metal foreign matter contained in a powdered acrylic acid polymer, that when such a polymer contains a large quantity of metal foreign matter, an electrode slurry formed from the polymer has an increased viscosity, resulting in poor dispersion of the active material and poor coating, and also becomes hard and brittle after being coated and dried, resulting in poor flex resistance. This phenomenon is thought to occur because metal ions derived from the metal foreign matter cause the acrylic acid polymer to form crosslinked structures. Removing metal foreign matter by the methods described in the above literature is not sufficiently effective, and it is necessary to thoroughly reduce the content of metal foreign matter mixed in the process of obtaining the acrylic acid polymer in powder or other solid form from a dispersion (slurry).

The present Description relates to a technology for effectively reducing metal foreign matter contained in an acrylic acid polymer, and use thereof, and provides a binder for a secondary battery electrode including an acrylic acid polymer, with which an increase in the viscosity of an electrode mixture layer composition and a decrease in flex resistance during electrode formation can be controlled, and use of the binder.

Solution to Technical Problem

As a result of various studies into methods of reducing metal species such as polyvalent metal ions and metal particles in acrylic acid polymers, and the effects of such methods, the inventors have found that as described above, by removing metal particles from the acrylic acid polymer while in this solid form, problems such as increased viscosity that occur when an acrylic acid polymer in powder or other solid form is redispersed could be suppressed or avoided, thereby allowing the formation of an electrode with excellent flex resistance. The present Description provides following means based on these findings.

[1] A binder for a secondary battery electrode, containing a crosslinked polymer or salt thereof having a carboxyl group, wherein the crosslinked polymer or salt thereof comprises 30 mass % or more and not more than 100 mass % of a structural unit derived from an ethylenically unsaturated carboxylic acid monomer, and a polyvalent metal ion content of the crosslinked polymer or salt thereof is not more than 100 ppm.

[2] A binder for a secondary battery electrode, containing a crosslinked polymer or salt thereof having a carboxyl group, wherein the crosslinked polymer or salt thereof comprises a structural unit derived from an ethylenically unsaturated carboxylic acid monomer constitutes 30 mass % or more and not more than 100 mass % of the crosslinked polymer or salt thereof, and a number of metal particles of 10 μm or more and not more than 100 μm in size per 1 g of the crosslinked polymer or salt thereof is not more than $10\times10^3$.

[3] The binder according to [1] or [2], wherein the crosslinked polymer or salt thereof comprises a structural unit derived from a crosslinkable monomer.

[4] The binder according to any one of [1] to [3], wherein a degree of neutralization of the crosslinked polymer is 50 mol % or more and not more than 100 mol %.

[5] A secondary battery electrode mixture layer composition, containing the binder according to any one of [1] to [4], together with an active material and water.

[6] A secondary battery electrode provided with an electrode layer containing the binder according to any one of [1] to [4] on a surface of a collector.

[7] A method for manufacturing a binder for a secondary battery electrode, the method comprising:
- preparing a crosslinked polymer or salt thereof; and
- removing metal particles from the crosslinked polymer or salt thereof in a solid state.

[8] The method according to [7], wherein the removing includes using magnetic force to remove the metal particles from the crosslinked polymer or salt thereof.

[9] The method according to [8], wherein the removing includes using a drum-type magnetic separator or an electromagnetic separator to remove the metal particles from the crosslinked polymer or salt thereof.

[10] The method according to any one of [7] to [9], wherein the crosslinked polymer or salt thereof comprises 30 mass % or more and not more than 100 mass % of a structural unit derived from an ethylenically unsaturated carboxylic acid.

DESCRIPTION OF EMBODIMENTS

The binder for a secondary battery electrode disclosed in this Description (hereunder sometimes called simply "the binder") may contain a crosslinked polymer having a carboxyl group, or a salt thereof (hereunder sometimes called simply "the polymer"). The polyvalent metal ion content of the polymer may be not more than 100 ppm. Furthermore, the number of metal particles 10 μm to 100 μm in size per 1 g of the polymer or salt thereof may be not more than $10\times10^3$ independently of the polyvalent metal ion content or together with the polyvalent metal ion content.

Because the polyvalent metal ion content and/or metal particle number of the polymer are as described above, it is possible to suppress a rise in the viscosity of the mixture layer composition in a slurry state containing a dispersion medium and ensure good coating properties and the like. It is also possible to suppress excessive hardening during electrode formation and obtain an electrode with good flex resistance.

Because the polymer manufacturing method comprises a removal step of removing metal particles from the polymer in a solid state, it is possible to obtain a secondary battery electrode with excellent characteristics.

The binder contains the polymer and can be mixed with an active material and water to obtain an electrode mixture layer composition (hereunder sometimes called simply "the composition"). This composition may be in a slurry form that can be coated on a collector or may be prepared as a wet powder suitable for being pressed on the surface of a collector. The secondary battery electrode disclosed in this Description (hereunder sometimes called simply "the electrode") can be obtained by forming a mixture layer from the composition on the surface of a collector made of copper foil, aluminum foil or the like.

Typical and non-limiting specific examples of the disclosures of the Description are explained in detail below with reference to the drawings. These detailed explanations are aimed simply at showing preferred examples of the disclosures of the Description in detail so that they can be implemented by a person skilled in the art, and are not intended to limit the scope of the disclosures of the Description. The additional features and disclosures disclosed below may be used separately or together with other features and teachings to provide a further improved binder for a secondary battery electrode, and use thereof.

The combinations of features and steps disclosed in the detailed explanations below are not essential for implementing the disclosures of the Description in the broadest sense, and are presented only for purposes of explaining typical examples of the disclosures of the Description in particular. Moreover, the various features of the typical examples above and below and the various features described in the independent and dependent claims do not have to be combined in the same way as in the specific examples described here, or in the listed order, when providing addition useful embodiments of the disclosures of the Description.

All features described in the Description and/or Claims are intended as individual and independent disclosures restricting the initial disclosures and the claimed matter specifying the teaching, separately from the constitution of features described in the Examples and/or Claims. Moreover, all descriptions of numerical ranges and groups or sets are intended to include intermediate configurations for purposes of restricting the initial disclosures and the claimed matter specifying the teaching.

In this Description, "(meth)acrylic" means acrylic and/or methacrylic, and "(meth)acrylate" means acrylate and/or methacrylate. Further, a "(meth)acryloyl group" means an acryloyl group and/or a methacryloyl group.

In this Description, the unit "ppm" means ppm (mass/mass).

Binder

The binder may contain the polymer, or in other words a crosslinked polymer having a carboxyl group or a salt of such a polymer. The binder may contain only the polymer but may also contain other binder components as described below. Preferably the polymer is contained in the amount of at least 50 mass %, or for example at least 60 mass %, or for example at least 70 mass %, or for example at least 80 mass %, or for example at least 90 mass %, or for example at least 95 mass %, or for example 100 mass % of the total binder components.

In the binder, the polyvalent metal ion content and/or the number of metal particles 10 μm to 100 μm in size in the polymer may be specified. By specifying the content of such metal species in the polymer, it is possible to specify the content of metal species in the polymer even in a secondary battery electrode binder or a secondary battery electrode mixture layer composition using the polymer. As a result, it is possible to surely achieve the original function of the polymer and obtain an electrode having excellent bending resistance and the like. Hereinafter, the content will be described, and then the structural unit of the present polymer, the mode as a crosslinked polymer, and the like will be described.

Content of Metal Species in the Polymer

Polyvalent Metal Ion Content

In the polymer, the polyvalent metal ion content of the polymer can be made to be not more than 100 ppm. Polyvalent metal ions are metal ions having a valence of at least 2. The presence of polyvalent metal ions allows metal crosslinks to form due to interactions with carboxyl groups in the polymer and the like, which can increase the slurry viscosity or reduce the flex resistance of the electrode by making the electrode mixture layer less uniform or affecting the hardness or brittleness of the electrode. It is thought that because the polymer has carboxyl groups, formation of metal crosslinks in the presence of polyvalent metal ions is promoted even if the polyvalent metal ions are only present in trace amounts.

The polyvalent metal ions are not particularly limited, but examples include Cu ($Cu^{2+}$), Mg ($Mg^{2+}$), Ca ($Ca^{2+}$), Zn ($Zn^{2+}$), Sr ($Sr^{2+}$), Ba ($Ba^{2+}$), Co ($Co^{2+}$, $Co^{3+}$), Ni ($Ni^{2+}$), Ce ($Ce^{2+}$), Al ($Al^{3+}$), Cr ($Cr^{2+}$), Mo ($Mo^{3+}$), Mn ($Mn^{2+}$, $Mn^{3+}$), Fe ($Fe^{2+}$, $Fe^{3+}$), Si ($Si^{2+}$, $Si^{4+}$), Zr ($Zr^{4+}$) and the like. Of these, particular examples include Cu ($Cu^{2+}$), Mg ($Mg^{2+}$), Ca ($Ca^{2+}$), Zn ($Zn^{2+}$), Fe ($Fe^{2+}$, $Fe^{3+}$), and the like. The numbers in brackets mainly represent the expected valence of the ions.

When the acidic groups such as carboxyl groups in the polymer have been neutralized, the polyvalent metal ions used for neutralization are excluded from measurement of the polyvalent metal ion content as described here.

The polyvalent metal ion content is not more than 100 ppm in the polymer. When the polyvalent metal ion content of the polymer is not more than 100 ppm, this may mean that the polyvalent metal ion content that the polymer can have in a solid form is not more than 100 ppm, or it may mean that the polyvalent metal ion concentration in a solution or dispersion (slurry or paste, etc.) containing the polymer as a solute or dispersoid is not more than 100 ppm relative to the polymer in a solid state. When describing the polymer in a solid state, the term "solid state" does not mean any specific form but means a powdered form or any solid state having a three-dimensional form. The polyvalent metal ion content may be measured under the following conditions.

[1] < When the Polymer is in a Solid State> The polymer is heated and dried for 3 hours at 80° C. under reduced pressure (≤50 mmHg) for example to remove volatile components. After being dried, 1 g of the polymer is collected in a quartz beaker, pre-treated by heated acid decomposition, and diluted with ultrapure water to a total volume of 20 g to prepare a measurement sample. The total amount of polyvalent metal ions in the resulting sample is measured based on the total amount of all polyvalent metal ions detected in the amount of at least 1 ppm of the polymer in ICP emission spectrometry, and the total amount of these polyvalent metal ions per 1 g of the polymer is calculated.

[2] < When the Polymer is in the Form of a Solution or Dispersion> In this case, the medium is removed from the solution or dispersion by heated drying or the like. The resulting polymer in a solid state is subjected to ICP emission spectrometry as explained under [1] above, the total amount of polyvalent metal ions is measured based on the total amount of all polyvalent metal ions detected in the amount of at least 1 ppm of the polymer, and the polyvalent metal ion content per 1 g of the polymer is calculated.

If the polyvalent metal ion content thus measured is not more than 100 ppm of the polymer, this means that increased viscosity due to crosslinking reactions and the like can be sufficiently suppressed when preparing the composition or a binder composition for the composition, making smooth coating possible, and appearance abnormalities such as streaks and seeds can also be sufficiently suppressed after coating and/or after rolling when forming the mixture layer (electrode), allowing a layer with good structure, organization and composition to be formed. It is also possible to maintain flex resistance by suppressing excessive hardening of the electrode caused by metal crosslinking due to the presence of polyvalent metal ions. By contrast, if the content exceeds 100 ppm the viscosity of the slurry increases dramatically, and appearance abnormalities tend to increase all at once and flex resistance tends to decline as a result. The content is preferably not more than 90 ppm, or not more than 80 ppm for example, or not more than 70 ppm for example, or not more than 60 ppm for example, or not more than 50 ppm for example, or not more than 40 ppm for example, or not more than 30 ppm for example.

Metal Particle Number

The number of metal particles 10 μm to 100 μm in size per 1 g of the polymer or salt thereof may be not more than $10\times10^3$ in the polymer. By itself, the presence of such metal particles detracts from the coating properties and leads to decreased filling properties and reduced surface smoothness due to seeds and the like in the mixture layer (electrode layer). Problems such as battery short circuits and ignition may also occur. Furthermore, in association with the polyvalent metal ion content the presence of such metal particles may also lead to increased viscosity of the slurry and reduced flex resistance of the mixture layer (electrode). It is thought that in the polymer of the teaching, formation of metal crosslinks due to the presence of such metal particles is further promoted because the polymer has carboxyl groups.

The metal constituting the metal particles is not particularly limited, but considering the manufacturing process and raw materials, examples include Fe and iron-based alloys (Fe, Cr, Ni) such as various stainless alloys. Considering the separation process, magnetic metals are also worth mentioning. Metal particles consisting at least partly of such metals are also included. The metal particles are preferably particles that exhibit magnetic properties overall and are attracted by magnetic force. The shape of the metal particles is also not particularly limited, and they may be spherical, bar shaped, needle shaped, flake shaped or irregular.

The number of these metal particles is not more than $10\times10^3$ per 1 g of polymer. Saying that the number of these metal particles in the polymer is not more than $10\times10^3$ may mean that the polymer in solid form may have not more than $10\times10^3$ particles, or it may mean that the number of the metal particles in a solution or dispersion (slurry or paste, etc.) containing the polymer as a solute or dispersoid is not more than $10\times10^3$ relative to the polymer in a solid state. The method for measuring the number of metal particles 10 μm to 100 μm in size per 1 g of polymer is as follows.

[1] < When the Polymer is in a Solid State> The polymer is heated and dried for 3 hours at 80° C. under reduced pressure (≤50 mmHg) for example to remove volatile components. After being dried, 1 g of the polymer is collected in a polyethylene container, and a suitable dispersion medium is added to prepare a dispersion with sufficient fluidity. An alcohol such as methanol or ethanol may be used as the dispersion medium for example. The concentration of the dispersion may be about 1 mass % for example. A bar-type neodymium magnet (surface magnetic flux density at least 2,500 Gauss) is introduced into the dispersion, which is then shaken for at least 30 minutes with a mix rotor at 80 rpm. The magnet is then removed from the dispersion medium, and air dried. Magnetic foreign matter adsorbed onto the magnet is transferred to a tape, the transfer surface is covered with transparent tape and photographed with an optical microscope at an overall magnification of 100× to 200×, and the number of particles 10 μm to 100 μm in size is counted with image analysis software (such as Olympus Stream from Olympus) or an equivalent. "Size" here means the longest distance between two parallel lines that touch on either side of a particle confirmed in the image.

[2] < When the Polymer is in the Form of a Solution or Dispersion> In this case, the solvent is removed from the solution or dispersion by heated drying or the like. As in [1] above, a dispersion is prepared with sufficient fluidity, the number of metal particles is measured, and the number of metal particles per 1 g of polymer is determined.

If the measured number of metal particles is not more than $10\times10^3$ per 1 g of the polymer, this means that increased viscosity due to crosslinking reactions with the metal particles and the like can be sufficiently suppressed when preparing the composition or a binder composition (binder dispersion) for the composition, making smooth coating possible, and appearance abnormalities such as streaks and seeds can also be sufficiently suppressed after coating and/or after rolling when forming the mixture layer (electrode), allowing a layer with good structure, organization and composition to be formed. By contrast, if the number exceeds $10\times10^3$ the viscosity of the slurry increases dramatically, and appearance abnormalities tend to increase all at once. This is because flex resistance declines drastically. The number is preferably not more than $9.7\times10^3$ for example, or not more than $9.6\times10^3$ for example, or not more than $9.0\times10^3$ for example, or not more than $8.0\times10^3$ for example, or not more than $7.0\times10^3$ for example, or not more than $6.0\times10^3$ for example, or not more than $5.0\times10^3$ for example, or not more than $4.0\times10^3$ for example, or not more than $3.0\times10^3$ for example, or not more than $2.0\times10^3$ for example, or not more than $1.0\times10^3$ for example.

Structural Units of Crosslinked Polymer

Structural Unit Derived from Ethylenically Unsaturated carboxylic acid Monomer

The polymer may have a structural unit (hereunder sometimes called "component (a)") derived from an ethylenically unsaturated carboxylic acid monomer. When the polymer has carboxyl groups due to having this structural unit, not only is adhesion to the collector improved, but the resulting electrode has low resistance and excellent high-rate characteristics due to the excellent ion conductivity and lithium ion desolvation effect. This also confers water swellability, which can enhance the dispersion stability of the active material and the like in the composition. The component (a) may be introduced into the polymer by polymerizing monomers including an ethylenically unsaturated carboxylic acid monomer for example. This may also be achieved by hydrolysis following (co)polymerization of a (meth)acrylic acid ester monomer. Other methods include treatment with a strong alkali following polymerization of (meth)acrylamide and (meth)acrylonitrile or the like and reacting an acid anhydride with the polymer having hydroxyl groups.

Examples of ethylenically unsaturated carboxylic acid monomers include (meth)acrylic acid, itaconic acid, crotonic acid, maleic acid, and fumaric acid; (meth)acrylamide alkyl carboxylic acids such as (meth)acrylamidohexanoic acid and (meth)acrylamidododecanoic acid; ethylenically unsaturated monomers having carboxyl groups, such as succinic acid monohydroxyethyl (meth)acrylate, ω-carboxy-caprolactone mono(meth)acrylate and β-carboxyethyl (meth)acrylate, and (partial) alkali neutralization products of these, and one of these may be used alone, or a combination of two or more may be used. Of these, a compound having an acryloyl group as a polymerizable functional group is preferred because the polymerization rate is faster, resulting in a polymer with a long primary chain length and a binder with good binding ability, and acrylic acid is especially desirable. A polymer with a high carboxyl group content can be obtained by using acrylic acid as the ethylenically unsaturated carboxylic acid monomer.

The content of the component (a) in the polymer is not particularly limited but may be from 10 mass % to 100 mass % of the total structural units of the polymer. Excellent adhesion to the collector can be easily ensured if the component (a) is contained within this range. The lower limit is for example 20 mass % or more, or for example 30 mass % or more, or for example 40 mass % or more. The lower limit may also be for example 50 mass % or more, or 60 mass % or more, or for example 70 mass % or more, or for example 80 mass % or more. If the content is at least 30 mass %, adhesion to the collector can be ensured, and the resulting electrode has excellent high-rate characteristics due to the excellent ion conductivity and lithium ion desolvation effect. This also confers water swellability, which can enhance the dispersion stability of the active material or the like in the composition. These effects tend to increase as the content of the component (a) is increased.

The upper limit is 100 mass %, and while 100 mass % may be suitable, the content may also be not more than 99 mass %, or not more than 98 mass %, or not more than 95 mass %, or not more than 90 mass % for example. When the polymer contains a structural unit derived from the crosslinkable monomer described below, the upper limit of the structural unit derived from the ethylenically unsaturated carboxylic acid monomer may be not more than 99.95 mass %, or not more than 99.9 mass %, or not more than 99.8 mass %, or not more than 99.7 mass %, or not more than 99.0 mass %.

The range of the component (a) may be determined by suitably combining the lower and upper limits described above and may for example be from 10 mass % to 100 mass %, or from 20 mass % to 100 mass %, or from 30 mass % to 100 mass %, or from 50 mass % to 100 mass %, or from 60 mass % to 100 mass %, or from 70 mass % to 100 mass % or the like. If the ratio of the component (a) as a percentage of the total structural units is less than 10 mass %, the dispersion stability and binding performance and the durability of the resulting battery may be insufficient.

Other Structural Units

In addition to the component (a), the polymer may also contain a structural unit (hereunder also called "component (b)") derived from another ethylenically unsaturated monomer that is copolymerizable with these. Examples of the component (b) include structural units derived from ethylenically unsaturated monomer compounds having anionic groups other than carboxyl groups such as sulfonic acid and phosphoric acid groups, and structural units derived from non-ionic ethylenically unsaturated monomers and the like. These structural units may be introduced by copolymerizing an ethylenically unsaturated monomer compound having anionic groups other than carboxyl groups such as sulfonic acid and phosphoric acid groups or a monomer containing a non-ionic ethylenically unsaturated monomer. Of these, a structural unit derived from a non-ionic ethylenically unsaturated monomer is desirable as the component (b) from the standpoint of obtaining an electrode with good flex resistance, while (meth)acrylamide or a derivative thereof or the like is desirable for improving the binding performance of the binder. When a structural unit derived from a hydrophobic ethylenically unsaturated monomer having a solubility of not more than 1 g/100 ml in water is introduced as the component (b), moreover, it can interact strongly with the electrode materials, resulting in good binding to the active material. This is desirable for obtaining a solid and well-integrated electrode mixture layer. A structural unit derived from an ethylenically unsaturated monomer containing an alicyclic structure is especially desirable.

The ratio of the component (b) may be from 0 mass % to 90 mass % of the total structural units of the polymer. The ratio of the component (b) may also be from 1 mass % to 60 mass %, or from 2 mass % to 50 mass %, or from 5 mass % to 40 mass %, or from 10 mass % to 30 mass %. When the component (b) is contained in the amount of at least 1 mass % of the total structural units of the polymer, an improvement effect on lithium-ion conductivity can be expected due to increased affinity for the electrolytic solution. When the polymer contains the component (b), the ratio of the component (a) is preferably from 40 to 99 mass %, or more preferably from 50 to 95 mass %, or still more preferably from 60 to 90 mass % of the total structural units of the crosslinked polymer.

To obtain a binder with excellent binding ability, the non-ionic ethylenically unsaturated monomer is preferably (meth)acrylamide or a derivative thereof or the like. Examples of (meth)acrylamide derivatives include N-alkyl (meth)acrylamide compounds such as isopropyl (meth)acrylamide, t-butyl (meth)acrylamide, N-n-butoxymethyl (meth) acrylamide and N-isobutoxymethyl (meth)acrylamide; and N,N-dialkyl (meth)acrylamide compounds such as dimethyl (meth)acrylamide and diethyl (meth)acrylamide, and one of these or a combination of two or more may be used.

A (meth)acrylic acid ester for example may also be used as a non-ionic ethylenically unsaturated monomer. Examples of (meth)acrylic acid esters include (meth)acrylic acid alkyl ester compounds such as methyl (meth)acrylate, ethyl (meth)acrylate, butyl (meth)acrylate, isobutyl (meth) acrylate and 2-ethylhexyl (meth)acrylate; (meth)acrylic acid cycloalkyl ester compounds such as cyclohexyl (meth)acrylate and methyl cyclohexyl (meth)acrylate; (meth)acrylic acid alkoxy alkyl ester compounds such as 2-methoxyethyl (meth)acrylate and ethoxyethyl (meth)acrylate; and (meth) acrylic acid hydroxyalkyl ester compounds such as hydroxyethyl (meth)acrylate, hydroxypropyl (meth)acrylate and hydroxybutyl (meth)acrylate and the like, and one of these or a combination of two or more may be used. When a (meth)acrylic acid ester is used as the nonionic ethylenically unsaturated monomer, the ratio of the structural unit derived from the (meth)acrylic acid ester is preferably from 1 to 30 mass %, or more preferably from 5 to 30 mass %, or still more preferably from 10 to 30 mass % of the total structural units of the polymer. In this case, the ratio of the component (a) is preferably from 70 to 99 mass %, or more preferably from 70 to 95 mass %, or still more preferably from 70 to 90 mass % of the total structural units of the polymer.

Of these, compounds having ether bonds, including alkoxy alkyl (meth)acrylates such as 2-methoxyethyl (meth) acrylate and ethoxy ethyl (meth)acrylate, are preferred for obtaining high lithium-ion conductivity and further improving the high-rate characteristics, and 2-methoxyethyl (meth) acrylate is especially desirable.

Of the non-ionic ethylenically unsaturated monomers, a compound having an acryloyl group is preferred because the polymerization rate is faster, resulting in a polymer with a long primary chain length and a binder with good binding ability. To obtain an electrode with good flex resistance, the non-ionic ethylenically unsaturated monomer is preferably a compound with a glass transition temperature (Tg) of not more than 0° C. of the homopolymer.

The polymer includes salt forms. That is, the acid groups in the polymer may be free, or at least some of the acid groups may form salts. The types of salts are not particularly limited, but examples include alkali metal salts of lithium, sodium, potassium and the like, alkali earth metal salts such as calcium salts and barium salts, other metal salts such as magnesium salts and aluminum salts, and ammonium salts, organic amine salts and the like. Of these, alkali metal salts and magnesium salts are desirable because they are unlikely to adversely affect the battery characteristics, and alkali metal salts are especially desirable. A lithium salt is especially desirable as an alkali metal salt.

Embodiments of Crosslinked Polymer

The method for crosslinking the polymer is not particularly limited, and examples include embodiments using the following methods.

1) Copolymerizing a crosslinkable monomer
2) Using chain transfer to the polymer chain during radical polymerization
3) Crosslinking after synthesis of a polymer having reactive functional groups, and after addition of a crosslinking agent as necessary Of these, a method of copolymerizing a crosslinkable monomer is preferred because the operations are easy and it is easy to control the degree of crossslinking.

Crosslinkable Monomer

Examples of crosslinkable monomers include polyfunctional polymerizable monomers having two or more polymerizable unsaturated groups, and monomers having self-crosslinkable functional groups such as hydrolyzable silyl groups and the like.

The polyfunctional polymerizable monomers are compounds having two or more polymerizable functional groups such as (meth)acryloyl or alkenyl groups in the molecule, and examples include polyfunctional (meth)acrylate compounds, polyfunctional alkenyl compounds, and compounds having both (meth)acryloyl and alkenyl groups and the like. One of these compounds may be used alone, or a combination of two or more may be used. Of these, a polyfunctional alkenyl compound is preferred for ease of obtaining a uniform crosslinked structure, and a polyfunctional allyl ether compound having a plurality of allyl ether groups in the molecule is especially desirable.

Examples of polyfunctional (meth)acrylate compounds include di(meth)acrylates of dihydric alcohols, such as ethylene glycol di(meth)acrylate, propylene glycol di(meth) acrylate, 1,6-hexanediol di(meth)acrylate, polyethylene glycol di(meth)acrylate and polypropylene glycol di(meth) acrylate; tri(meth)acrylates of trihydric and higher polyhydric alcohols, such as trimethylolpropane tri(meth) acrylate, trimethylolpropane ethylene oxide modified tri (meth)acrylate, glycerin tri(meth)acrylate, pentaerythritol tri(meth)acrylate and pentaerythritol tetra(meth)acrylate; poly(meth)acrylates such as tetra(meth)acrylate and bisamides such as methylene bisacrylamide and hydroxyethylene bisacrylamide and the like.

Examples of polyfunctional alkenyl compounds include polyfunctional allyl ether compounds such as trimethylolpropane diallyl ether, trimethylolpropane triallyl ether, pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene and the like.

Examples of compounds having both (meth)acryloyl and alkenyl groups include allyl (meth)acrylate, isopropenyl (meth)acrylate, butenyl (meth)acrylate, pentenyl (meth) acrylate and 2-(2-vinyloxyethoxy)ethyl (meth)acrylate and the like.

Specific examples of the monomers having self-crosslinkable functional groups include vinyl monomers containing hydrolysable silyl groups, and N-methylol (meth)acrylamide, N-methoxyalkyl (meth)acrylate and the like. One of these compounds or a mixture of two or more may be used.

The vinyl monomers containing hydrolysable silyl groups are not particularly limited as long as they are vinyl monomers having at least one hydrolysable silyl group. Examples include vinyl silanes such as vinyl trimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacrylate; vinyl ethers containing silyl groups, such as trimethoxysilylpropyl vinyl ether; and vinyl esters containing silyl groups, such as vinyl trimethoxysilyl undecanoate and the like.

When the polymer is crosslinked with a crosslinkable monomer, the amount of the crosslinkable monomer used is preferably 0.02 to 0.7 mol %, or more preferably 0.03 to 0.4 mol % of the total amount of the monomers (non-crosslinkable monomers) other than the crosslinkable monomer. The amount of the crosslinkable monomer is preferably at least 0.02 mol % because this results in good binding ability and greater stability of the mixture layer slurry. If the amount is not more than 0.7 mol %, the polymer tends to be more stable.

Furthermore, the amount of the crosslinkable monomer used is preferably 0.05 to 5 mass %, or more preferably 0.1 to 4 mass %, or still more preferably 0.2 to 3 mass %, or even more preferably 0.3 to 2 mass % of the total constituent monomers of the polymer.

In the composition, the polymer is preferably used in the form of a salt with the carboxyl groups and other acid groups derived from the ethylenically unsaturated carboxylic acid monomer neutralized to a degree of neutralization of 20 to 100 mol %. The degree of neutralization is more preferably from 50 to 100 mol %, such as for example at least 60 mol %, or at least 65 mol %, or at least 70 mol %, or at least 75 mol %, or at least 80 mol %, or at least 85 mol %, or at least 90 mol %, or at least 95 mol %. A degree of neutralization of at least 50 mol % is desirable for easily obtaining good water swellability and dispersion stabilization effects.

In this Description, the degree of neutralization can be calculated from the charged amounts of the monomers having carboxyl or other acid groups and the neutralizing agent used for neutralization. The degree of neutralization can be confirmed by drying the polymer for 3 hours at 80° C. under reduced pressure, subjecting the resulting powder to IR measurement, and comparing the intensities of a peak derived from C═O groups of the carboxylic acid and a peak derived from C═O groups of the carboxylic acid salt.

Method for Manufacturing Crosslinked Polymer or Salt/Method for Manufacturing Secondary Battery Electrode Binder The polymer as a binder component of the binder can be manufactured by the following preparatory step (polymerization step). The polymer manufacturing method described below may be implemented as the method for manufacturing the binder.

Preparatory Step

The preparatory step is a step of preparing the polymer. Typically, it is a step of polymerizing the polymer. A known polymerization method such as solution polymerization, precipitation polymerization, suspension polymerization or emulsion polymerization may be used for the polymer, but precipitation polymerization and suspension polymerization (reverse-phase suspension polymerization) are preferred for reasons of productivity. A non-uniform polymerization method such as precipitation polymerization, suspension polymerization or emulsion polymerization is preferred for obtaining superior performance in terms of binding and the like, and precipitation polymerization is especially preferred. Precipitation polymerization is a method of manufacturing a polymer by performing a polymerization reaction in a solvent that dissolves the starting material (unsaturated monomer) but effectively does not dissolve the resulting polymer. As polymerization progresses, the polymer particles grow larger by aggregation and polymer growth, resulting in a dispersion of polymer particles micrometers to tens of micrometers in size formed by secondary aggregation of primary particles tens of nanometers to hundreds of nanometers in size. A dispersion stabilizer may also be used to control the particle size of the polymer. The secondary aggregation described above can also be suppressed by selecting the dispersion stabilizer, polymerization solvent and the like. In general, when secondary aggregation has been suppressed the precipitated polymer is also called a dispersed polymer.

In the case of precipitation polymerization, the polymerization solvent may be selected from water and various organic solvents and the like depending on the type of monomer used and the like. To obtain a polymer with a longer primary chain length, it is desirable to use a solvent with a small chain transfer constant.

Specific examples of polymerization solvents include water-soluble solvents such as methanol, t-butyl alcohol, acetone, methyl ethyl ketone, acetonitrile and tetrahydrofuran, and benzene, ethyl acetate, dichloroethane, n-hexane, cyclohexane and n-heptane and the like, and one of these or a combination of two or more may be used. Mixed solvents of these with water may also be used. In this Description, a water-soluble solvent is one having a solubility of more than 10 g/100 ml in water at 20° C. Of these solvents, methyl ethyl ketone and acetonitrile are preferred because, for example, polymerization stability is good, with less production of coarse particles and adhesion to the reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because the operation is easier in the process neutralization described below.

To achieve a stable and rapid neutralization reaction during this process neutralization, moreover, it is desirable to add a small amount of a high polar solvent to the polymerization solvent. Desirable examples of this highly polar solvent are water and methanol. The amount of the highly polar solvent used is preferably 0.05 to 10.0 mass %, or more preferably 0.1 to 5.0 mass %, or still more preferably 0.1 to 1.0 mass % based on the total mass of the medium. If the ratio of the highly polar solvent is at least 0.05 mass %, the effect on the neutralization reaction is achieved, while if it is not more than 10.0 mass %, there is no adverse effect on the polymerization reaction. When polymerizing a highly hydrophilic ethylenically unsaturated carboxylic acid monomer such as acrylic acid, moreover, adding a highly polar solvent serves to increase the polymerization rate and make it easier to obtain a polymer with a long primary chain length. Of the highly polar solvents, water in particular is desirable because it has a strong improvement effect on the polymerization rate.

The polymer may also be obtained by polymerizing monomer components including an ethylenically unsaturated carboxylic acid monomer in the presence of an organic amine compound. A binder containing a polymer thus obtained may exhibit strong binding ability. When monomer components including an ethylenically unsaturated carboxylic acid monomer have been polymerized in the presence of an organic amine compound, polymerization stability is also improved, and the polymer can be manufactured stably even at a high monomer concentration. The monomer concentration may be at least about 10.0 mass % for example but is preferably at least 13.0 mass % from the standpoint of binding ability. The monomer concentration is preferably at least 15.0 mass %, or more preferably at least 17.0 mass %, or yet more preferably at least 19.0 mass %. The monomer concentration is still more preferably at least 20.0 mass %, or especially at least 22.0 mass %, or most preferably at least 25.0 mass %. The molecular weight is normally higher the higher the monomer composition during polymerization, so a polymer with a long primary chain length can be manufactured. Because the polymer of the teaching is a micro-crosslinked polymer obtained by applying a suitable degree of crosslinking to a polymer having a sufficiently long primary chain length, it is analytically difficult to directly measure its primary chain length. It is known that the primary chain length of a polymer ordinarily correlates with solution viscosity, but in the case of the present polymer the solution viscosity differs depending on the degree of crosslinking. Thus, it is extremely difficult to specify the structure or properties of the polymer of the teaching when it is obtained by the above methods. In this Description, the "monomer concentration" is the concentration of monomers in the reaction solution at the start of polymerization.

The upper limit of the monomer concentration differs according to the types of monomers and solvents used, the polymerization method and the various polymerization conditions and the like, but assuming that the heat of the polymerization reaction can be removed, the upper limit is about 40% in the case of precipitation polymerization, or about 50% in the case of suspension polymerization, or about 70% in the case of emulsification polymerization.

In addition to ammonia, examples of the organic amine compound include N-alkyl substituted amines such as monomethylamine, dimethylamine, trimethylamine, monoethylamine, diethylamine, triethylamine, monobutylamine, dibutylamine, tributylamine, monohexylamine, dihexylamine, trihexylamine, trioctylamine and tridodecylamine; (alkyl) alkanolamines such as monoethanolamine, diethanolamine, triethanolamine, propanolamine, dimethylethanolamine and N,N-dimethylethanolamine; cyclic amines such as pyridine, piperidine, piperazine, 1,8-bis(dimethylamino) naphthalene, morpholine and diazabicycloundecene (DBU); and diethylenetriamine and N,N-dimethylbenzylamine, and one or two or more of these may be used. Of these, an organic amine compound other than ammonia is desirable from the standpoint of binding ability. A hydrophobic amine having a long-chain alkyl group is desirable for ensuring polymerization stability even at high monomer concentrations because it provides greater electrostatic repulsion and three-dimensional repulsion. Specifically, the higher the value (C/N) representing the ratio of the number of carbon atoms relative to the number of nitrogen atoms in the organic amine compound, the greater the polymerization stabilization effect due to three-dimensional repulsion. The value of C/N is preferably at least 3, or more preferably at least 5, or still more preferably at least 10, or most preferably at least 20.

This manufacturing method preferably includes a polymerization step of polymerizing monomer components including an ethylenically unsaturated carboxylic acid monomer, and for example preferably includes a polymerization step of polymerizing monomer components including an ethylenically unsaturated carboxylic acid monomer derived from the component (a) in the amount of from 10 mass % to 100 mass % and an ethylenically unsaturated monomer derived from the component (b) in the amount of from 0 mass % to 90 mass % of the components. A structural unit (component (a)) derived from an ethylenically unsaturated carboxylic acid monomer is introduced into the polymer in the amount of from 10 mass % to 100 mass % by this polymerization step. The amount of the ethylenically unsaturated carboxylic acid monomer used is for example from 20 mass % to 100 mass %, or for example from 30 mass % to 100 mass %, or for example from 50 mass % to 99 mass %. The polymerization step is preferably performed by a precipitation polymerization method in order to easily obtain a polymer fine particle with a highly uniform small particle diameter.

In addition to the ethylenically unsaturated carboxylic acid monomer, another ethylenically unsaturated monomer that is copolymerizable with the ethylenically unsaturated carboxylic acid monomer may be included as a monomer component in this manufacturing method. This ethylenically unsaturated monomer may be for example an ethylenically unsaturated monomer compound having an anionic group other than a carboxyl group, such as a sulfonic acid group or phosphoric acid group, and a non-ionic ethylenically unsaturated monomer or the like. Examples of specific compounds include monomer compounds that can be used to introduce the component (b) above. The other ethylenically unsaturated monomer may constitute from 0 mass % to 90 mass %, or from 1 mass % to 60 mass %, or from 5 mass % to 50 mass %, or from 10 mass % to 30 mass % of the total amount of the monomer components. The above crosslinkable monomer may also be used in the same way.

A known polymerization initiator such as an azo compound, organic peroxide or inorganic peroxide may be used as a polymerization initiator, without any particular restrictions. The conditions of use may be adjusted to achieve a suitable amount of radical generation, using a known method such as thermal initiation, redox initiation using a reducing agent, UV initiation or the like. To obtain a crosslinked polymer with a long primary chain length, the conditions are preferably set so as to reduce the amount of radical generation within the allowable range of manufacturing time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy)butane (product name "Perhexa 22" by NOF Corporation), t-butylhydroperoxide (product name "Perbutyl H" by NOF Corporation), cumene hydroperoxide (product name "Percumyl H" by NOF Corporation), 1,1,3,3-tetramethylbutyl hydroperoxide (product name "Perocta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecanoate (product name "Perhexyl ND" by NOF Corporation), t-butyl peroxyneodecanoate (product name "Perbutyl ND" by NOF Corporation), t-butyl peroxyneoheptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2,5-di(2-ethylhexanoyl) hexane (product name "Perhexa 250" by NOF Corporation), 1,1,3,3-tetramethylbutylperoxy-2-ethylhexanoate (product name "Perocta O" by NOF Corporation), t-hexylperoxy-2-ethylhexanoate (product name "Perhexyl O" by NOF Corporation), t-butylperoxy-2-ethylhexanoate (product name "Perbutyl O" by NOF Corporation), t-butyl peroxylaurate (product name "Perbutyl L" by NOF Corporation), t-butyl peroxy-3,5,5-trimethylhexanoate (product name "Perbutyl 355" by NOF Corporation), t-hexylperoxyisopropyl monocarbonate (product name "Perhexyl I" by NOF Corporation), t-butylperoxyisopropyl monocarbonate (product name "Perbutyl I" by NOF Corporation), t-butyl-oxy-2-ethyl hexyl monocarbonate (product name "Perbutyl E" by NOF Corporation), t-butyl peroxyacetate (product name "Perbutyl A" by NOF Corporation), t-hexyl peroxybenzoate (product name "Perhexyl Z" by NOF Corporation) and t-butyl peroxybenzoate (product name "Perbutyl Z" by NOF Corporation) and the like. One of these or a combination of two or more may be used.

Examples of the inorganic peroxide include potassium persulfate, sodium persulfate and ammonium persulfate. When using a redox initiator, sodium sulfite, sodium thiosulfate, sodium formaldehyde sulfoxylate, ascorbic acid, sulfite gas ($SO_2$), ferrous sulfate or the like can be used as the reducing agent.

The polymerization initiator is preferably used in the amount of, for example, 0.001 to 2 mass parts, or more preferably, for example, 0.005 to 1 mass parts, or still more preferably, for example, 0.01 to 0.1 mass parts given 100 mass parts as the total amount of the monomer components used. If the amount of the polymerization initiator is at least 0.001 mass parts, a stable polymerization reaction can be achieved, while if it is not more than 2 mass parts a polymer with a long primary chain length can be easily obtained.

Regarding the concentration of the monomer components during polymerization, a higher concentration is preferred for obtaining a polymer with a longer primary chain length. If the concentration of the monomer components is too high, however, aggregation of polymer particles tends to progress, the polymerization heat is difficult to control, and a runaway polymerization reaction is possible. Thus, in the case of precipitation polymerization for example the monomer concentration at the start of polymerization is normally in the range of from about 2 to 40 mass %, or preferably from 5 to 40 mass %. The polymer is preferably obtained by polymerizing with a monomer concentration of at least 13.0 mass % at the start of polymerization. The monomer concentration is more preferably at least 15.0 mass %, or still more preferably at least 17.0 mass %, or yet more preferably at least 19.0 mass %, or even more preferably at least 20.0 mass %. The monomer concentration is especially preferably at least 22.0 mass %, or most preferably at least 25.0 mass %. The polymerization temperature depends on the conditions such as the type and concentration of the monomer used, but is preferably 0° C. to 100° C. or more preferably 20° C. to 80° C. The polymerization temperature may be constant, or may vary during the course of the polymerization reaction. The polymerization time is preferably 1 minute to 20 hours, or more preferably 1 hour to 10 hours.

Neutralization Step

When an unneutralized monomer or a partially neutralized salt is used as an ethylenically unsaturated carboxylic acid monomer in this manufacturing method, a step of adding an alkali compound to the polymer dispersion obtained from the polymerization step may be performed first to neutralize the polymer (hereunder also called "process neutralization") before removing the solvent in the drying step described below to obtain the polymer in a solid state. Alternatively, the polymer in an unneutralized or partially neutralized salt state may also be first dried in a drying step to obtain the polymer in a powder or other solid form, after which a step is performed of adding an alkali compound to form a salt and neutralize the polymer (hereunder also called "post-neutralization") when preparing the electrode mixture slurry. Of these, process neutralization is preferred because secondary aggregations tend to be easier to break up.

Solid-Liquid Separation Step and/or Washing Step

After the polymerization step or after the neutralization step of process neutralization but before the drying step, a solid-liquid separation step by centrifugation and filtration or the like and/or a washing step using water, methanol or the same solvent as the polymerization solvent or the like may be provided after the polymerization step with the aim of removing polyvalent metal ions and impurities derived from the initiator and the like. When a solid-liquid separation step is performed, polyvalent metal ions in the liquid may be removed. When a washing step is provided, polyvalent metal ions and the like may be removed.

Preferably the content of residual solvent and unreacted monomers in the polymer powder is as small as possible due to concerns of odor, battery performance and stability (battery swelling due to gasification, etc.). Specifically, the content in the polymer powder is preferably not more than 2.0 mass %, or more preferably not more than 1.0 mass %, or still more preferably not more than 0.5 mass %, or yet more preferably not more than 0.1 mass %.

Drying Step

The polymer dispersion obtained through the polymerization step may be subjected to a drying step by drying under reduced pressure and/or heat to remove the solvent and obtain the target polymer in a solid state such as a powder.

The drying step is a step in which the polymerization solvent and the like are removed from the polymer dispersion after the polymerization step to obtain the polymer in a drier or more solid state. The drying method and drying conditions in the drying step are not particularly limited and known methods may be used. For example, drying may be performed under reduced pressure of 50 mmHg or less at 50° C. to 150° C. for 1 hour to 10 hours, depending on the type and amount of the polymerization solvent used.

Pulverization Step

The pulverization step is a step of pulverizing the dried polymer. The pulverization step may be performed as necessary so as to facilitate sieving and removal of metal particles from the polymer in the subsequent sieving step and/or metal particle removal step. The pulverization step may be performed with a known pulverization apparatus.

Sieving Step

The sieving step is a step in which particles at or above a particular particle size are separated by sieving to remove polymer aggregates or foreign matter that has contaminated the polymer during the process. The sieving step is not essential, but as discussed below, it is desirable for removing metal particles larger than 100 μm, improving the slurry coating properties and the uniformity of the mixture layer, and facilitating the efficient removal of metal particles in the subsequent removal step.

The sieving system in the sieving step is not particularly limited, and various known sieving systems may be used. For example, a vibration system using ultrasound, a method using blown air, or a method using forced stirring or the like may be used appropriately.

In the sieving step, the sieving may be sufficient to separate out particles larger than about 100 μm in diameter. Typically, these can be separated out using a 100 μm mesh. Metal particles larger than 100 μm can thus be efficiently removed from the polymer. Considering that it can remove metal particles larger than 100 μm, the sieving step can also be implemented as one embodiment of the metal particle removal step.

Metal Particle Removal Step

The metal particle removal step is a step to remove metal particles from the polymer in a solid state. The means for removing the metal particles in the removal step are not particularly limited, but for example the step can be implemented as a magnetic separation step using a technique of removing metal particles by magnetic force.

For the magnetic force, either a system using a magnet such as a permanent magnet or a system using electromagnetism may be used without limitations. A system using electromagnetism is suitable because such a system is compact, can efficiently form high magnetic flux density regions with strong magnetic separation ability, and can remove foreign matter by stopping energization and applying vibration.

The removal of metal particles by magnetic force is not particularly limited, and a known magnetic separator applicable to powders may be used. Examples of magnetic separators include various devices such as bar magnets and various forms of lattice magnets (permanent magnets) that are placed in the powder flow path to perform magnetic separation; electromagnetic separators (electromagnets) that perform efficient magnetic separation by adjusting the magnetic flux; drum-type magnetic separators (permanent magnets) that perform magnetic separation using a magnetic body disposed in a drum by supplying a powder to the rotating drum; pulley-type magnetic separators that perform magnetic separation on a belt with a magnetic body on a pulley such as a high-magnetic pulley or magnetic pulley; and suspended magnetic separators (permanent magnets or electromagnets) that are suspended above a conveyor belt. Of these, electromagnetic separators are suitable as described above, and drum-type magnetic separators are desirable from the standpoint of magnetic selection efficiency and the like.

When removing metal particles by magnetic force, the surface magnetic flux density of the magnet or electromagnet is not particularly limited but may be at least 5,000 gauss for example. If it is at least 5,000 gauss, metal particles can be removed efficiently and reliably. The higher the magnetic flux density, the more efficiently the metal particles can be captured. Preferably it is at least 10,000 gauss or more preferably at least 12,000 gauss.

The polymer having a metal ion content of not more than 100 ppm can be obtained by this manufacturing method. Furthermore, the number of metal particles 10 μm to 100 μm in size per 1 g of the polymer can be kept at not more than $10\times10^3$. The preferred polyvalent metal ion content and number of metal particles per 1 g of the polymer were explained above. The polyvalent metal ions can also be removed effectively from the liquid by performing solid-liquid separation and/or a washing step prior to the drying step.

In this manufacturing method, the polymer after the metal particle removal step may be subjected to a measuring step to measure the polyvalent metal ion content and/or a measuring step to measure the number of metal particles 10 μm to 100 μm in size. By performing these measuring steps, it is possible to reliably obtain a polymer in which the content of metal species such as polyvalent metal ions and metal particles is controlled.

Composition for Secondary Battery Electrode Mixture Layer

The composition contains a binder containing the polymer, together with an active material and water. The amount of the polymer used in the composition is for example 0.1 mass % to 20 mass % of the total amount of the active material. This amount may also be for example from 0.2 mass % to 10 mass %, or for example from 0.3 mass % to 8 mass %, or for example from 0.4 mass % to 5 mass %. If the polymer and polymer salt are used in the amount of less than 0.1 mass %, adequate binding ability may not be obtained. The dispersion stability of the active material and the like may also be inadequate, detracting from the uniformity of the formed mixture layer. If the polymer and polymer salt are used in an amount exceeding 20 mass %, on the other hand, the electrode mixture layer composition may become too viscous, detracting from the coating properties on the collector. Seeds and irregularities may occur in the resulting mixture layer as a result, adversely affecting the electrode characteristics.

If the polymer and polymer salt are used within the above range, a composition with excellent dispersion stability can be obtained, and the resulting mixture layer can have strong adhesiveness on the collector and excellent flex resistance, resulting in improved battery durability. Furthermore, the polymer and polymer salt exhibit sufficiently high binding ability even when used in a small amount (such as 5 mass % or less) relative to the active material, and since they also contain carboxy anions, they can yield an electrode with low interface resistance and excellent high-rate characteristics.

Of the active materials described above, lithium salts of transition metal oxides are principally used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM $\{Li(Ni_x,Co_y,Mn_z), x+y+z=1\}$ and NCA $\{Li(Ni_{1-a-b}Co_aAl_b)\}$ and the like, which are referred to as ternary materials. Examples of spinel-type positive electrode active materials include lithium manganate and the like. Apart from oxides, phosphate salts, silicate salts and sulfur and the like may also be used. Examples of phosphate salts include olivine-type lithium iron phosphate and the like. One of these may be used alone as a positive electrode active material, or two or more may be combined and used as a mixture or composite.

When a positive electrode active material containing a laminar rock salt-type lithium-containing metal oxide is dispersed in water, the dispersion exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component eluted from the active material by using the polymer, which is unneutralized or partially neutralized, as the binder. The amount of the unneutralized or partially neutralized polymer used is preferably such that the amount of unneutralized carboxyl groups in the polymer is at least equivalent to the amount of alkali eluted from the active material.

Because all the positive electrode active materials have low electrical conductivity, a conductive aid is normally added and used. Examples of conductive aids include carbon materials such as carbon black, carbon nanotubes, carbon fiber, graphite fine powder, and carbon fiber. Of these, carbon black, carbon nanotubes and carbon fiber are preferred to make it easier to obtain excellent conductivity. As the carbon black, ketjen black and acetylene black are preferable. One of these conductive aids may be used alone, or a combination of two or more may be used. The amount of the conductive aid used as a percentage of the active material may be from 0.2 to 20 mass % or from 0.2 to 10 mass % for example from the standpoint of achieving both conductivity and energy density. The positive electrode active material may also be one that has been surface coated with a carbon material having electrical conductivity.

Examples of negative electrode active materials include carbon materials, lithium metal, lithium alloys, metal oxides and the like, and one of these or a combination of two or more may be used. Of these, an active material formed of a carbon material such as natural graphite, artificial graphite, hard carbon, and soft carbon (hereunder referred to as a "carbon-based active material") is preferred, and hard carbon or a graphite such as natural graphite or artificial graphite is more preferred. In the case of graphite, spheroidized graphite is desirable from the standpoint of battery performance, and the particle size thereof is preferably in the range of, for example, 1 to 20 μm, or more preferably, for example, 5 to 15 μm. To increase the energy density, metals, metal oxides or the like capable of occluding lithium, such as silicon and tin, can also be used as negative electrode active materials. Of these, silicon has a higher capacity than graphite, and an active material formed of a silicon material such as silicon, a silicon alloy or a silicon oxide such as silicon monoxide (SiO) (hereunder referred to as a "silicon-based active material") may be used. Although these silicon-based active materials have high capacities, however, the volume change accompanying charging and discharging is large. Therefore, they are preferably used in combination with the aforementioned carbon-based active materials. In this case, a large compounded amount of the silicon active material can cause breakdown of the electrode material, greatly detracting from the cycle characteristics (durability). From this perspective, when a silicon-based active material is included the amount thereof is preferably, for example, not more than 60 mass %, or more preferably, for example, not more than 30 mass % of the amount of the carbon-based active material.

In a binder containing the polymer, the polymer has a structural unit (component (a)) derived from an ethylenically unsaturated carboxylic acid monomer. The component(a) here has strong affinity for silicon active materials and exhibits good binding ability. It is therefore thought that this binder exhibits excellent binding ability even when using high-capacity type active materials including silicon active materials and is therefore effective for improving the durability of the resulting electrode.

Because carbon active materials themselves have good electrical conductivity it may not be necessary to add a conduction aid. When a conduction aid is added to further reduce resistance or the like, the amount thereof is for example not more than 10 mass % or not more than 5 mass % of the total amount of the active material out of considerations of energy density.

When the composition is in slurry form, the amount of the active material used is in the range of from 10 to 75 mass % or in the range of 30 to 65 mass % for example relative to the total amount of the composition. Using the active material in the amount of at least 10 mass % is not only effective for controlling migration of the binder and the like, but is also useful from the standpoint of solvent drying costs. If the amount is not more than 75 mass %, on the other hand, it is possible to ensure the fluidity and coating properties of the composition and to form a uniform mixture layer.

When preparing the composition in wet powder form, the amount of the active material used is in the range of for example from 60 to 97 mass % or from 70 to 90 mass % relative to the total amount of the composition. From the standpoint of energy density, the non-volatile components other than the active material, such as the binder and the conductive aid, are preferably reduced as far as possible while still maintaining binding ability and conductivity.

The composition uses water as a medium. To adjust the physical properties, drying ability and the like of the composition, it is also possible to use a mixed solvent of water with a lower alcohol such as methanol or ethanol, a carbonate such as ethylene carbonate, a ketone such as acetone, or another water-soluble organic solvent such as tetrahydrofuran or N-methylpyrrolidone. The ratio of water in the mixed solvent is for example at least 50 mass %, or for example at least 70 mass %.

When the composition is made into a coatable slurry, the content of medium including water as a percentage of the total composition may be in the range of for example from 25 to 90 mass %, or for example from 35 to 70 mass % considering the coating properties of the slurry, the energy costs required for drying, and the productivity. When the composition is made into a wet powder state suitable for pressing, the content of the medium may be in the range of for example from 3 to 40 mass % or for example from 10 to 30 mass % considering the uniformity of the pressed mixture layer.

The binder components contained in the composition may consist solely of the polymer of the teaching, but this may also be combined with another binder component such as styrene/butadiene latex (SBR), acrylic latex or vinylidene polyfluoride. When another binder component is used, the amount thereof may be for example from 0.1 to 5 mass % or for example from 0.1 to 2 mass % or for example from 0.1 to 1 mass % of the active material. If the amount of the other binder component exceeds 5 mass % resistance may rise, and the high-rate characteristics may become inadequate. Of those listed above, styrene/butadiene latex is preferred for achieving a superior balance of binding performance and flex resistance.

The composition has the above active material, water and binder as essential components, and these components may be mixed by known means. The method for mixing the components is not particularly limited, and may be a known method, but preferably is a method of first dry blending the powder components including the active material, a conduction aid and the polymer (binder), and then mixing in the dispersion media including water and dispersing and kneading. When the composition is obtained as a slurry, it is preferably made into a slurry without dispersion problems or aggregation. The mixing means may use a known mixer such as a planetary mixer, thin-film spin mixer or self-rotating mixer, but a thin-film spin mixer is preferred for obtaining good dispersion in a short period of time. When using a thin-film spin mixer, it is desirable to pre-disperse the mixture with an agitator such as a Disper in advance. For the viscosity of the slurry, the B-type viscosity at 60 rpm may be in the range of for example from 500 to 100,000 mPa·s, or for example from 1,000 to 50,000 mPa·s. The slurry viscosity of the composition is preferably in the range of for example from 1,000 to 10,000 mPa·s, or more preferably from 1,000 to 8,000 mPa·s, or still more preferably from 1,000 to 7,000 mPa·s, or yet more preferably from 1,000 to 6,000 mPa·s, or even more preferably from 1,000 to 5,000 mPa·s, or especially from 1,000 to 4,000 mPa·s, or most preferably from 1,000 to 3,000 mPa·s.

When the composition is in a wet powder state, on the other hand, it is preferably kneaded with a Henschel mixer, blender, planetary mixer or twin-screw kneader or the like until it is in a uniform state without concentration irregularities.

The composition contains the polymer of the teaching, but if the composition contains too many polyvalent metal ions, the stability of the slurry may decline due to interactions with carboxyl groups of the polymer, potentially reducing the uniformity and binding ability of the electrode mixture layer and detracting from flex resistance. From this perspective, as explained above with reference to the polymer, the polyvalent metal ion content in the composition is preferably not more than 100 ppm of the polymer. Furthermore, the number of metal particles 10 μm to 100 μm in size per 1 g of the polymer is preferably not more than $10\times10^3$.

This Description also provides a method for manufacturing the composition, comprising a preparatory step of manufacturing the polymer so that the content of metal species is controlled as described above, and a step of using this polymer to prepare the composition.

Secondary Battery Electrode

The electrode is provided with a mixture layer formed from the composition on the surface of a collector made of copper, aluminum or the like. The mixture layer is formed by first coating the composition on the surface of the collector and then drying and removing the water and other media. The method for coating the composition is not particularly limited, and a known doctor blade method, dip method, roll coating method, comma coating method, curtain coating method, gravure coating method, extrusion method or the like may be used. Drying may also be accomplished by a known method such as warm air blowing, reduced pressure drying, (far) infrared drying, microwave irradiation or the like. Normally the mixture layer obtained after drying is pressed with a metal press, roll press or the like. Pressing causes the active material and binder to adhere tightly and can improve the strength of the mixture layer and its adhesiveness on the collector. The thickness of the mixture layer can be adjusted by pressing to about 30% to 80% of the thickness before pressing, and the thickness of the mixture layer after pressing is normally about 4 to 200 μm.

This Description also provides a method for manufacturing the electrode, comprising a preparatory step in which the polymer is manufactured with the content of metal species controlled as described above, a step of using the polymer to prepare the composition, and a step of using the composition to prepare the electrode.

A nonaqueous electrode secondary battery can then be prepared by providing a separator and a nonaqueous electrolyte with the electrode. The separator is disposed between the positive and negative electrodes of the battery, and serves to prevent short-circuits due to contact between the electrodes, hold the electrolyte solution and ensure ion conductivity. The separator is an insulating finely porous film, and preferably has good ion permeability and mechanical strength. Specific materials that can be used include polyolefins such as polyethylene and polypropylene, and polytetrafluoroethylene and the like.

For the nonaqueous electrolyte, a known electrolyte solution commonly used in nonaqueous electrolyte secondary batteries can be used. Specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in this solvent and used as the nonaqueous electrolyte. The nonaqueous electrolyte secondary battery can be obtained by separating the positive and negative electrode plates with a separator and making them into a wound structure or laminated structure that is then enclosed in a case or the like.

As explained above, the binder for a nonaqueous electrolyte secondary battery electrode that is disclosed in this Description can suppress or prevent an increase in viscosity in a mixture composition containing a dispersion medium such as water and provides excellent flex resistance when used to prepare an electrode. Therefore, good integrity can be ensured and good durability (cycle characteristics) even after repeated charge and discharge can be expected with a nonaqueous electrolyte secondary battery comprising an electrode obtained using this binder.

EXAMPLES

The manufacture and use of the polymer disclosed in this Description are explained using specific examples, but the disclosures of this Description are not limited by these examples. Moreover, "parts" and "%" below indicate mass parts and mass % unless otherwise specified.

Manufacturing Examples of the Polymer

Manufacturing Example 1: Manufacture of Crosslinked Polymer Salt R-1

A reactor equipped with a stirring blade, a thermometer, a condenser and a nitrogen introduction pipe was used for polymerization. 567 parts of acetonitrile, 2.20 parts of deionized water, 100 parts of acrylic acid (hereunder called "AA"), 0.60 parts of pentaerythritol allyl ether (Daiso Chemical, Neoallyl P-30) and triethylamine in the amount of the 1.0 mol % of the AA were loaded into the reactor.

The reactor was thoroughly purged with nitrogen, and heated to raise the internal temperature to 55° C. Once the internal temperature was confirmed to have stabilized at 55° C., 0.040 parts of 2,2'-azobis(2,4-dimethylvaleronitrile) (V-65, manufactured by Wako Pure Chemical) were added, and this was taken as the polymerization initiation point because white turbidity was observed in the reaction solution. The monomer concentration was calculated to be 15.0%. The polymerization reaction was continued while adjusting the external temperature to maintain the internal temperature at 55° C., and 6 hours after the polymerization initiation point the internal temperature was raised to 65° C. The internal temperature was maintained at 65° C., cooling was initiated once 12 hours had passed since the reaction initiation point, and once the internal temperature had fallen to 25° C., 52.5 parts of a powder of lithium-hydroxide monohydrate (hereunder called "$LiOH \cdot H_2O$") were added. Stirring was continued at room temperature for 12 hours after addition to obtain a polymerization reaction solution in the form of a slurry comprising particles of the crosslinked polymer salt R-1 (Li salt, 90 mol % neutralized) dispersed in a medium. The resulting polymerization reaction solution was centrifuged to precipitate the polymer particles, and the supernatant was removed. The precipitate was then collected and dried at 80° C. under reduced pressure to remove volatile components and obtain a powder of a crosslinked polymer salt.

100 kg of the crosslinked polymer salt powder obtained above was pulverized with a crusher and sieved with an ultrasonic vibrating sieve (100 μm mesh). This was then introduced at a rate of 50 kg/hr into a drum-type magnetic separator (Seiho Co., Ltd. Non-belt II Lenastar NBII LNS504, surface magnetic flux density on magnet surface 13,000 gauss) to perform magnetic separation and obtain a powder of the crosslinked polymer salt R-1. Because the crosslinked polymer salt R-1 is hygroscopic, it was stored sealed in a container having water vapor barrier properties. When the powder of the crosslinked polymer salt R-1 was subjected to IR measurement to determine the degree of neutralization from the ratio of the intensities of a peak derived from C═O groups of the carboxylic acid and a peak derived from C═O groups of the carboxylic acid Li salt, the result of 90 mol % was equivalent to the value calculated from the charged components. When the polyvalent metal ion content and the number of metal particles 10 μm to 100 μm in size were measured in the powder of the crosslinked polymer salt R-1, the polyvalent ion content was 30 ppm and the number of metal particles was 538/g.

Polyvalent Metal Ion Content 1 g of the crosslinked polymer salt was taken in a quartz beaker, pre-treated by heated acid decomposition using sulfuric acid, nitric acid and hydrogen peroxide, and diluted with ultrapure water to a total volume of 20 g to prepare a measurement sample. The resulting sample was assayed with an ICP emission spectrometer (Spectro Arcos, manufactured by Spectro Analytical Instruments). The total concentration of all polyvalent metal ions with a concentration of at least 1 ppm in the crosslinked polymer salt was calculated.

Number of Metal Particles 1 g of the crosslinked polymer salt and 100 g of methanol were added to a plastic container to prepare a dispersion. A bar-type neodymium magnet (5 φ×10 mm, surface magnetic flux density 4,000 gauss) was inserted into this dispersion, which was shaken for 30 minutes with a mix rotor. After shaking, the magnet was removed from the dispersion medium, and air dried. Magnetic foreign matter adsorbed on the magnet was transferred to tape, and the transfer part was covered with transparent tape. The transfer part was photographed with a DSX110 optical microscope, and the number of metal contaminants 10 to 100 μm in size was counted with Olympus Stream image analysis software.

Manufacturing Example 2: Manufacture of Crosslinked Polymer Salt R-2

A powder of a crosslinked polymer salt R-2 was obtained by the same operations as in the manufacturing example 1 except that the types and charged amounts of the raw materials were as shown in Table 1. Because the crosslinked polymer salt R-2 is hygroscopic, it was stored sealed in a container having water vapor barrier properties. When the powder of the crosslinked polymer salt R-2 was subjected to IR measurement to determine the degree of neutralization from the ratio of the intensities of a peak derived from CO═O groups of the carboxylic acid and a peak derived from C═O groups of the carboxylic acid Li salt, the result of 90 mol % was equivalent to the value calculated from the charged components. The polyvalent metal ion concentration in the powder of the crosslinked polymer salt R-2 was 34 ppm, and the number of metal contaminants was 642/g.

Manufacturing Example 3: Manufacture of Crosslinked Polymer Salt R-3

A powder of a crosslinked polymer salt R-3 was obtained by the same operations as in the manufacturing example 1 except that an electromagnetic separator (NMI Co. AT-CG-150HHH, magnetic flux density with core 15,500 gauss) was used as the magnetic separator. Because the crosslinked polymer salt R-3 is hygroscopic, it was stored sealed in a container having water vapor barrier properties. When the powder of the crosslinked polymer salt R-3 was subjected to IR measurement to determine the degree of neutralization from the ratio of the intensities of a peak derived from C═O groups of the carboxylic acid and a peak derived from C═O groups of the carboxylic acid Li salt, the result of 90 mol % was equivalent to the value calculated from the charged components. The polyvalent metal ion concentration in the powder of the crosslinked polymer salt R-3 was 48 ppm, and the number of metal contaminants was 2,196/g.

Manufacturing Example 4: Manufacture of Crosslinked Polymer Salt R-4

A powder of a crosslinked polymer salt R-4 was obtained by the same operations as in the manufacturing example 1 except that a lattice magnet (Magnetec Japan, Ltd. round bar type, surface magnetic flux density 15,000 gauss, magnet φ25 mm, 4-bar and 5-bar sets installed alternately in two stages) was used as the magnetic separator. Because the crosslinked polymer salt R-4 is hygroscopic, it was stored sealed in a container having water vapor barrier properties. When the powder of the crosslinked polymer salt R-4 was subjected to IR measurement to determine the degree of neutralization from the ratio of the intensities of a peak derived from C═O groups of the carboxylic acid and a peak derived from C═O groups of the carboxylic acid Li salt, the result of 90 mol % was equivalent to the value calculated from the charged components. The polyvalent metal ion concentration in the powder of the crosslinked polymer salt R-4 was 75 ppm, and the number of metal contaminants was 5,833/g.

Manufacturing Example 5: Manufacture of Crosslinked Polymer Salt R-5

A powder of a crosslinked polymer salt R-5 was obtained by the same operations as in the manufacturing example 1 except that a lattice magnet (Magnetec Japan, Ltd. round bar type, surface magnetic flux density 15,000 gauss, magnet φ25 mm, set of 4) was used as the magnetic separator. Because the crosslinked polymer salt R-5 is hygroscopic, it was stored sealed in a container having water vapor barrier properties. When the powder of the crosslinked polymer salt R-5 was subjected to IR measurement to determine the degree of neutralization from the ratio of the intensities of a peak derived from C═O groups of the carboxylic acid and a peak derived from C═O groups of the carboxylic acid Li salt, the result of 90 mol % was equivalent to the value calculated from the charged components. The polyvalent metal ion concentration in the powder of the crosslinked polymer salt R-5 was 98 ppm, and the number of metal contaminants was 9,649/g.

Manufacturing Example 6: Manufacture of Crosslinked Polymer Salt R-6

A powder of a crosslinked polymer salt R-6 was obtained by the same operations as in the manufacturing example 1 except that no magnetic separation was performed. Because the crosslinked polymer salt R-6 is hygroscopic, it was stored sealed in a container having water vapor barrier properties. When the powder of the crosslinked polymer salt R-6 was subjected to IR measurement to determine the degree of neutralization from the ratio of the intensities of a peak derived from C═O groups of the carboxylic acid and a peak derived from C═O groups of the carboxylic acid Li salt, the result of 90 mol % was equivalent to the value calculated from the charged components. The polyvalent metal ion concentration in the powder of the crosslinked polymer salt R-6 was 181 ppm, and the number of metal contaminants was 14,985/g.

Manufacturing Example 7: Manufacture of Crosslinked Polymer Salt R-7

A powder of a crosslinked polymer salt R-7 was obtained by the same operations as in the manufacturing example 2 except that no magnetic separation was performed. Because the crosslinked polymer salt R-7 is hygroscopic, it was stored sealed in a container having water vapor barrier properties. When the powder of the crosslinked polymer salt R-7 was subjected to IR measurement to determine the degree of neutralization from the ratio of the intensities of a peak derived from C═O groups of the carboxylic acid and a peak derived from C═O groups of the carboxylic acid Li, the result of 90 mol % was equivalent to the value calculated from the charged components. The polyvalent metal ion concentration in the powder of the crosslinked polymer salt R-7 was 163 ppm, and the number of metal contaminants was 12,436/g.

TABLE 1

| Manufacturing Example No. | | | Manufacturing Example 1 | Manufacturing Example 2 | Manufacturing Example 3 | Manufacturing Example 4 | Manufacturing Example 5 | Manufacturing Example 6 | Manufacturing Example 7 |
|---|---|---|---|---|---|---|---|---|---|
| Crosslinked polymer (salt) | | | R-1 | R-2 | R-3 | R-4 | R-5 | R-6 | R-7 |
| Charged [parts] | Monomer | AA | 100 | 60 | 100 | 100 | 100 | 100 | 60 |
| | | DMAA | | 40 | | | | | 40 |
| | Crosslinkable monomer | P-30 | 0.6 | 0.6 | 0.6 | 0.6 | 0.6 | 0.6 | 0.6 |
| | Polymerization medium | Deionized water | 2.20 | 2.20 | 2.20 | 220 | 2.20 | 2.20 | 2.20 |
| | | AcN | 567 | 567 | 567 | 567 | 567 | 567 | 567 |
| | Polymerization initiator | V-65 | 0.040 | 0.040 | 0.040 | 0.040 | 0.040 | 0.040 | 0.040 |
| | Process neutralization | LiOH•$H_2O$ | 52.5 | 31.5 | 52.5 | 52.5 | 52.5 | 52.5 | 31.5 |
| Initial monomer concentration [wt %] | | | 15.0% | 15.0% | 15.0% | 15.0% | 15.0% | 15.0% | 15.0% |
| Neutralized salt | Type | | Li | Li | Li | Li | Li | Li | Li |
| | Degree of neutralization | | 90% | 90% | 90% | 90% | 90% | 90% | 90% |
| Magnetic separator | Type | | Drum | Drum | Electro-magnetic | Lattice 4-stage | Lattice 1-stage | | |
| Polyvalent metal ion concentration [wtppm] | | | 30 | 34 | 48 | 75 | 98 | 181 | 163 |
| Number of metal particles | | | 538 | 642 | 2,196 | 5,833 | 9,649 | 14,985 | 12,436 |

The abbreviations used in the Table 1 are explained below.

AA: Acrylic acid

DMAA: Dimethylacrylamide

P-30: Pentaerythritol triallyl ether (Daiso Chemical, Neoallyl P-30)

AcCN: Acetonitrile

V-65: 2,2'-azobis(2,4-dimethylvaleronitrile) (Wako Pure Chemical V-65)

Preparation and Evaluation of Secondary Battery Electrode Mixture Composition and Electrode

Example 1

3.2 parts of the crosslinked polymer Li salt R-1 in powder form were weighed into 100 parts of natural graphite and thoroughly mixed in advance, after which 160 parts of deionized water were added and the mixture was pre-dispersed with a Disper and then dispersed for 15 seconds at a peripheral speed of 20 m/second with a thin film spin mixer (Primix FM-56-30) to obtain a negative electrode mixture layer composition in slurry form. The slurry (solids) concentration was calculated to be 39.2%.

Measuring Viscosity of Electrode Slurry

The slurry viscosity of the negative electrode mixture layer composition (slurry) obtained above was measured at a shear velocity of on a CP25-5 cone plate (diameter 25 mm, cone angle 5°) with an Anton Paar Co. Rheometer (Physica MCR301), and found to be 2,420 mPa·s.

Evaluating Coating Properties

The mixture layer composition was applied with a variable applicator to a 20 micron-thick copper foil (UACJ Foil Corp.) and dried for 15 minutes at 100° C. with an air drier to form a mixture layer. The mixture layer was then pressed to a thickness of 50±5 microns and a packing density of 1.70±0.20 g/cm$^3$. The external appearance of the resulting mixture layer (15 cm×15 cm) was observed visually, and the coating properties were evaluated based on the following standard and given a rank of "A". A rank of A to C below means a passing level on the product evaluation and a rank of D or E means a failing level.

A: No appearance abnormalities such as streaks or seeds observed

B: Slight streaks observed on surface, but no seeds observed

C: Slight streaks and seeds observed on surface

D: Streaks and seeds observed on surface overall

E: Appearance abnormalities including streaks and sees conspicuous on surface

Evaluating Flex Resistance

The negative electrode obtained above was cut into a 25 mm-wide strip and wrapped once around a φ2.0 mm SUS bar, the condition of the curved mixture layer was observed, and flex resistance was evaluated according to the following standard and ranked as "A". A rank of A to C below means a passing level on the product evaluation and a rank of D or E means a failing level.

A: No appearance abnormalities in mixture layer

B: Slight cracks in mixture layer, but copper foil not exposed

C: Cracks observed in mixture layer, but no peeling of mixture layer

D: Cracks observed in mixture layer, with slight peeling and detachment of mixture layer E: Cracks observed in mixture layer, with obvious peeling and detachment of mixture layer Examples 2 to 5, Comparative Examples 1 to 2

Negative electrode mixture layer compositions were obtained by the same operations as Example 1 except that the crosslinked polymer salts shown in Table 2 were used. The viscosity, coating properties and flex resistance of the electrode mixture layers were evaluated with the results shown in Table 2.

TABLE 2

| | | Example 1 | Example 2 | Example 3 | Example 4 | Example 5 | Comparative Example 1 | Comparative Example 2 |
|---|---|---|---|---|---|---|---|---|
| Active material | Graphite | 100 | 100 | 100 | 100 | 100 | 100 | 100 |
| Crosslinked polymer | Type | R-1 | R-2 | R-3 | R-4 | R-5 | R-6 | R-7 |
| | Parts | 3.2 | 3.2 | 3.2 | 3.2 | 3.2 | 3.2 | 3.2 |
| Deionized water | | 160 | 160 | 160 | 160 | 160 | 160 | 160 |
| Mixture layer slurry concentration | | 39.2% | 39.2% | 39.2% | 39.2% | 39.2% | 39.2% | 39.2% |
| Electrode slurry viscosity (mPa · s) | | 2,420 | 2,760 | 4,180 | 5,410 | 6,930 | 10,200 | 8,730 |
| Coating properties | | A | A | B | C | C | E | E |
| Flex resistance | | A | A | A | B | C | E | E |

As shown in Table 2, when the polyvalent metal ion content of the crosslinked polymer salt is not more than 100 ppm and the number of metal particles 10 μm to 100 μm in size is not more than 10×10$^3$/g, good slurry viscosity can be secured, together with good coating properties and flex resistance. By contrast, when the polyvalent metal ion content is above 100 ppm and the number of metal particles exceeds 10×10$^3$/g, the coating properties and flex resistance decline dramatically.

It was also found that the polyvalent metal ion content and the number of metal particles in such a crosslinked polymer salt affect the viscosity of the slurry for the mixture layer. That is, when the polyvalent metal ion content is above 100 ppm and the number of metal particles 10 μm to 100 μm exceeds 10×10$^3$/g, the slurry viscosity rises above 8,000 mPa·s, detracting greatly from the coating properties and significantly reducing the flex resistance.

The invention claimed is:

1. A binder for a secondary battery electrode, the binder comprising a crosslinked polymer or salt thereof having a carboxyl group, wherein:

the crosslinked polymer or salt thereof comprises 60 mass % or more and not more than 100 mass % of a structural unit derived from an ethylenically unsaturated carboxylic acid monomer, a polyvalent metal ion content relative to the total amount of the crosslinked polymer or salt thereof, wherein the crosslinked polymer or salt thereof is in powder form, is not more than 50 ppm, and a number of metal particles of 10 μm or more and not more than 100 μm in size per 1 g of the crosslinked polymer or salt thereof, wherein the crosslinked polymer or salt thereof is in powder form, is not more than 1.0×10$^3$.

2. The binder according to claim 1, wherein the crosslinked polymer or salt thereof comprises a structural unit derived from a crosslinkable monomer.

3. The binder according to claim 1, wherein a degree of neutralization of the crosslinked polymer is 50 mol % or more and not more than 100 mol %.

4. A secondary battery electrode mixture layer composition, containing the binder according to claim 1, together with an active material and water.

5. A secondary battery electrode provided with an electrode layer containing the binder according to claim 1 on a surface of a collector.

6. A method for manufacturing the binder according to claim 1, the method comprising:

preparing a crosslinked polymer or salt thereof; and removing metal particles from the crosslinked polymer or salt thereof in a powder form and thereby obtaining the binder in which:

the crosslinked polymer comprises 60 mass % or more and not more than 100 mass % of the structural unit derived from an ethylenically unsaturated carboxylic acid monomer, the polyvalent metal ion content relative to the total amount of the crosslinked polymer or salt thereof, wherein the crosslinked polymer or salt thereof is in powder form, is not more than 50 ppm, and the number of metal particles of 10 μm or more and not more than 100 μm in size per 1 g of the crosslinked polymer or salt thereof, wherein the crosslinked polymer or salt thereof is in powder form, is not more than $1.0\times10^3$.

7. The method according to claim 6, wherein the removing includes using magnetic force to remove the metal particles from the crosslinked polymer or salt thereof in powder form.

8. The method according to claim 7, wherein the removing includes using a drum-type magnetic separator or an electromagnetic separator to remove the metal particles from the crosslinked polymer or salt thereof in powder form.

9. The binder according to claim 1, wherein the ethylenically unsaturated carboxylic acid monomer comprises acrylic acid.

10. The binder according to claim 1, wherein the polyvalent metal ion content is a concentration based on the total amount of polyvalent metal ions detected by ICP emission spectrometry on a solution in which the polymer is dissolved by thermal acid decomposition.

11. The binder according to claim 9, wherein the polyvalent metal ion content is a concentration based on the total amount of polyvalent metal ions detected by ICP emission spectrometry on a solution in which the polymer is dissolved by thermal acid decomposition.

12. The secondary battery electrode mixture layer composition according to claim 5, wherein a viscosity as B-type viscosity at 60 rpm is from 1,000 mPa·s to 3,000 mPa·s.

* * * * *